E. H. SLOAN, Jr.
ANIMAL TRAP.
APPLICATION FILED AUG. 13, 1912.
1,056,714.
Patented Mar. 18, 1913.
2 SHEETS—SHEET 1.
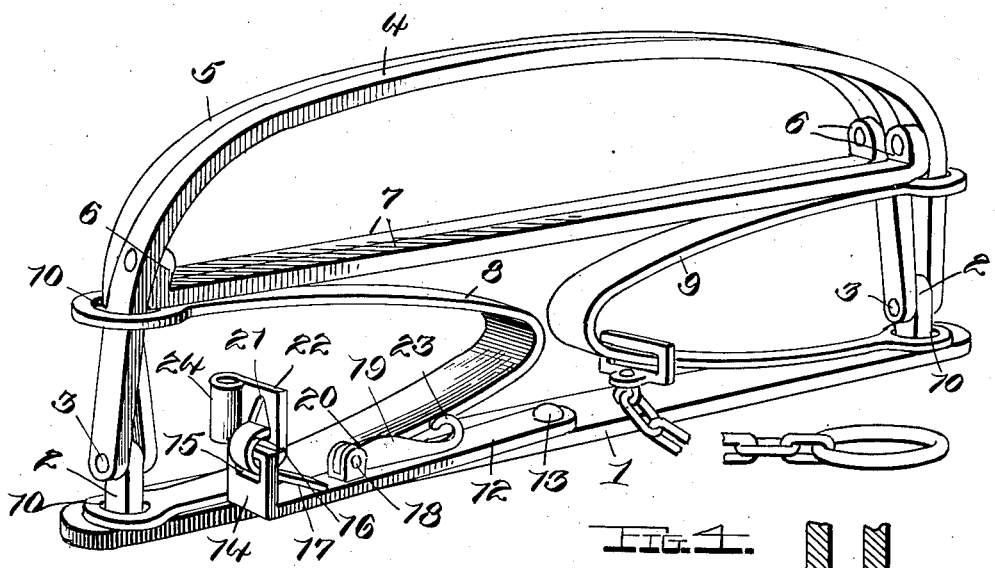
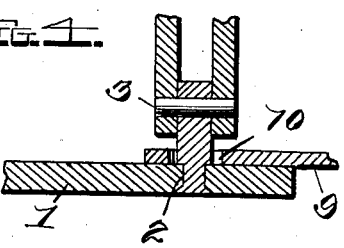
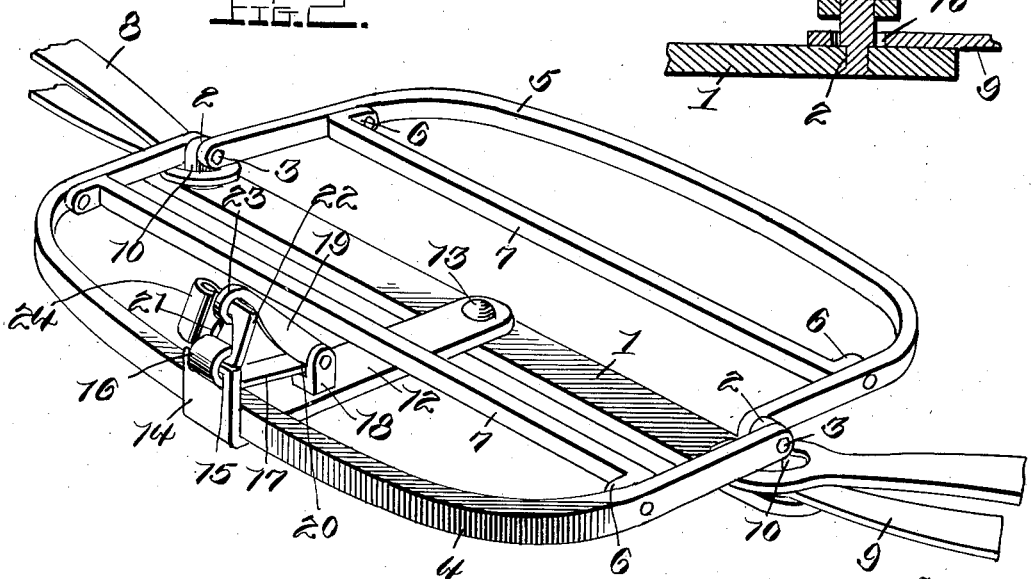
Witnesses
Inventor
E. H. Sloan Jr.
By Victor J. Evans
Attorney E. H. SLOAN, Jr.
ANIMAL TRAP.
APPLICATION FILED AUG. 13, 1912.
1,056,714.
Patented Mar. 18, 1913.
2 SHEETS—SHEET 2.
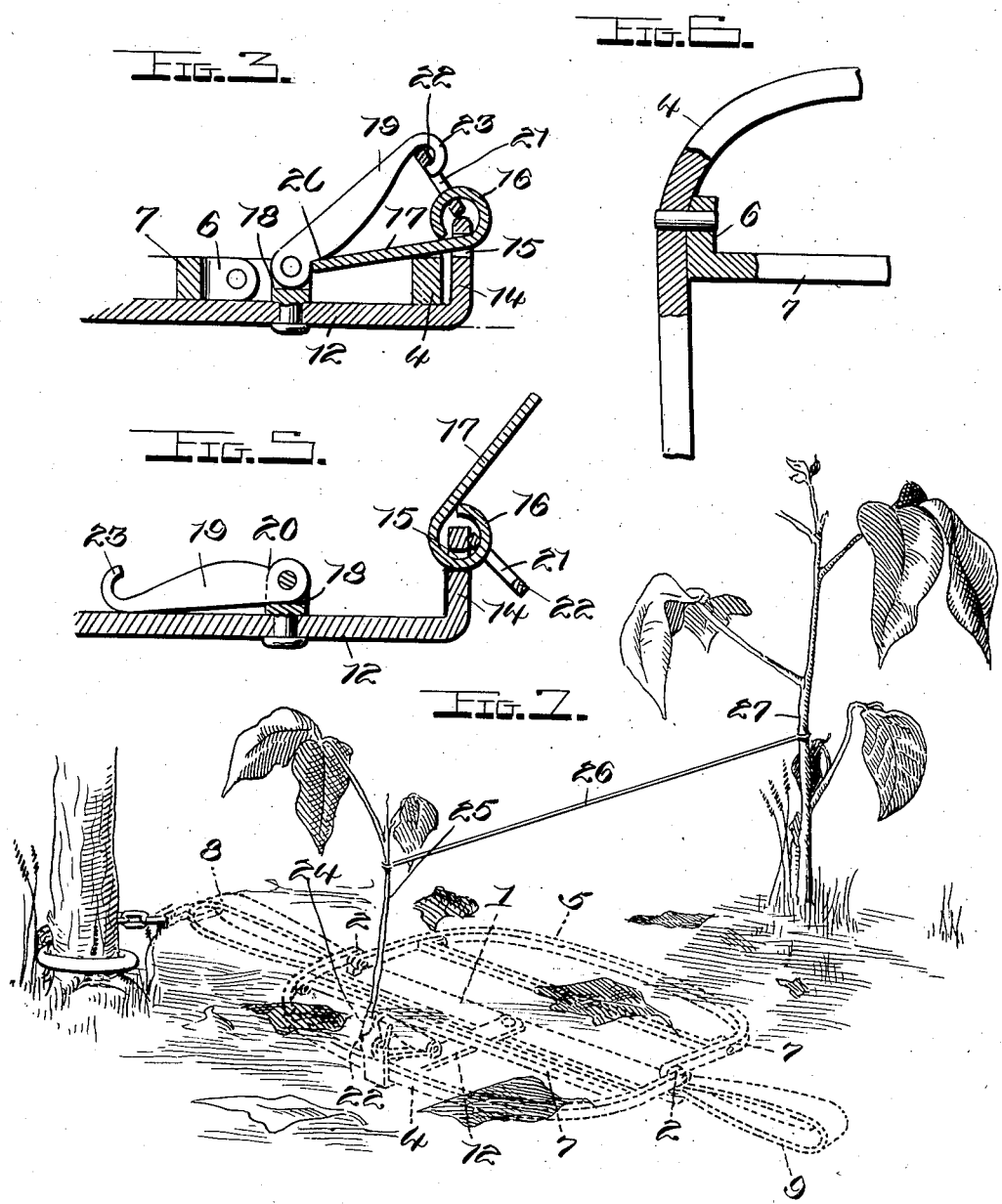

UNITED STATES PATENT OFFICE.

EMANUEL H. SLOAN, JR., OF CORONA, NEW MEXICO.

ANIMAL-TRAP.

1,056,714.  Specification of Letters Patent.  Patented Mar. 18, 1913.

Application filed August 13, 1912. Serial No. 714,835.

*To all whom it may concern:*

Be it known that I, EMANUEL H. SLOAN, Jr., a citizen of the United States, residing at Corona, in the county of Lincoln and State of New Mexico, have invented new and useful Improvements in Animal-Traps, of which the following is a specification.

This invention relates to traps primarily intended for trapping large or fur bearing animals, the object of the invention being to provide a spring actuated jaw trap in which the employment of the usual bait plates is dispensed with, the said trap adapted to be buried in the foliage and having a string or the like connected with the trigger of the trap and overlying the said buried trap which, upon contact, will actuate the jaws of the trap to secure the animal passing over the trap.

Another object of the invention is to provide a trap with means whereby the spring actuated jaws will not be accidentally sprung during the process of burying the trap.

A still further object of the invention is to provide a trap comprising pivoted spring actuated jaws each having an additional jaw pivotally connected thereto and whereby the leg of the animal is grasped at two separate and distinct points.

With the above objects in view, and others which will appear as the nature of the invention progresses, the improvement resides in the novel construction and combination of parts hereinafter fully described and claimed.

In the drawings, accompanying this specification, there has been illustrated a simple and preferred embodiment of the improvement, and in which drawings,—

Figure 1 is a perspective view of a trap constructed in accordance with the present invention, the parts being illustrated in their folded position. Fig. 2 is a similar view showing the jaws of the trap swung to their open position and retained by the trigger. Fig. 3 is a central transverse sectional view, taken through the trigger support when the device is in the position illustrated in Fig. 2. Fig. 4 is a detail central longitudinal sectional view taken adjacent one end of the trap. Fig. 5 is a detail sectional view illustrating the parts of the trigger when the same have been actuated. Fig. 6 is a transverse sectional view illustrating the manner of connecting the lower jaws with the upper jaws. Fig. 7 is a view illustrating the means for retaining the trap in its set up position, the trap being buried in the shrubbery or foliage and parts of the same being indicated by dotted lines.

The improved trap, as heretofore stated, is adapted to secure large or fur bearing animals, and as is well known in the art of trapping, such animals, in order to obtain release from the trap, have the habit of gnawing and severing their feet, thus leaving the severed foot within the trap and permitting of the animal making his escape. It is also well known in this art that the animal gnaws his engaged foot or paw beneath its contact by the jaws of the trap. The portion of the paw or leg of the animal swells above its contact by the jaws of the trap, and it is one of the primary objects of the present invention to provide a trap having means whereby the paw or leg of the animal will be engaged at two separate and distinct points, so that should the animal gnaw away his foot which is engaged by the lower jaws of the trap, the foot will still be retained by the upper jaws of the trap.

In the drawings, like numerals of reference designate corresponding parts throughout the several views.

In the said drawings, the numeral 1 designates the base for the trap. This base 1 comprises a substantially rectangular member formed of any suitable hardened material, metal preferred. This base 1 adjacent its opposite ends is formed with rectangular slots, which are adapted to receive the lower reduced portions of standards 2. The reduced portions of the said standards, which depend below the lower face of the base, are flattened or otherwise rigidly secured to the said base. Each of the standards 2 is provided with a perforation or opening, the said openings being adapted to receive pintles 3 whereby the coacting and oppositely arranged upper jaws 4 and 5 are hingedly connected with the base. These jaws 4 and 5 are each of the well known arch type, and pivotally connected to each of the said jaws a suitable distance above their pivotal engagement with the standards 2 are the right angular ends 6 of what I term retaining jaw members 7. By reference to the figures of the drawings, it will be noted that the off-set or inturned ends 6 of each of the lower jaws 7 is comparatively slight, so that the swinging of the said jaws is thereby limited.

The numerals 8 and 9 designate the two armed spring members which have their extremities provided with openings 10 which engage between the base 1 and the off-set arms of the substantially U-shaped upper jaw members 4 and 5. The upward swing of these two armed springs 8 and 9 may be limited by their contact with the lower jaws 7. The eyes or openings 10 in the ends of each of the springs 8 and 9 are of sufficient area to permit of the said springs being swung upon the base 1 of the trap, as illustrated in Fig. 1 of the drawings.

The numeral 12 designates a trigger supporting bar which is pivoted approximately centrally of the base 1 as at 13. The opposite end of this support 12 is off-set or bent upwardly as at 14, the said upturned portion being formed adjacent its extremity with an opening 15. This opening 15 is adapted to receive the eye 16 of what may be termed the trigger proper which is designated by the numeral 17. The base of the trigger support is provided with a rotatable member 18, the same having its upper extremity bifurcated and secured between the arms provided by the said bifurcation is what I term a hook 19. This hook 19 has its lower edge, or that adjacent its connection with the rotatable member 18 formed with an inturned or depressed portion 20, and the trigger 17 which is constructed of a flattened piece of material has its free extremity engaging with the said depression 20 when the jaw 4 is swung to an outward position and below the trigger 17. Connected with the eye 16 of the trigger 17 through the medium of a substantially V-shaped slot 21 is a twig holder or tripping element 22 of the trigger. The hook member 19 also comprises a flattened element, the same having its extremity inturned as at 23 and which, when the trap is in its set-up position, is adapted to engage above the upper extremity of the member 22 and the inturned portion or hook proper engaged between the upper walls formed by the V-shaped opening 21. The tripping element 22 is provided with a twig receiving sleeve 24. The twig 25 which is adapted to be received within the sleeve 24 has connected thereto a cord or analogous element 26, which is preferably of a color corresponding with the color of the foliage within which the trap is buried. The numeral 27 designates a second twig or sapling to which the opposite end of the cord 26 is attached, the said cord being arranged above and transversely of the said jaws of the trap.

From the above description, taken in connection with the accompanying drawings, it will be obvious that an animal contacting the cord 26 will swing the tripping member 22 toward the base of the trap, thus, through the tension of the springs, causing the jaws to contact with and be released from the trigger 17 and the hook member 19 and to be swung to grasp the foot and leg of the animal.

It will be obvious that when the trigger is actuated the jaws 4 and 5 will be tightly forced against each other to securely engage with the leg of the animal trapped, and that the jaws 7 will swing upon their pivots to permit of the same bearing comparatively lightly against the leg of the animal. As stated, the offset portions 6 of the jaws 7 are comparatively slight so that the jaws are limited in their outward swinging movement. Furthermore, it will be noted, by reference to Fig. 1 of the drawings, that the said offset members are curved to correspond with the curved sides of the jaws 4, and this arrangement also limits the swinging movement in an upward direction of the jaws 7 with relation to the jaws 4 and 5. Again the jaws 7 are preferably, and as illustrated in the drawings, rectangular in cross section, and an attempt at the withdrawal of the leg of the animal through the jaws will, when the said leg contacts with the edges of the jaw 7, tend to swing the said jaws to a closed position. The space between the jaws 4 and 7 is not sufficient to permit of the animal inserting his nose to engage with that part of the leg or paw held by the said jaws 4 and 5, and as the swelling of the leg or paw, as well as the pain incident to the grasping of the leg of the animal is confined between the upper portions of the jaws 4 and 5 and that of the jaw 7, the animal will not attempt to gnaw that portion of his foot below the jaw 7, so that injury to his skin is thus effectively overcome.

It will be noted that when the elements comprising the trigger are in their set up position a twig may be inserted between the inturned or rounded extension of the hook 19 through the V-shaped opening 21 of the trip member 22, the said twig forming a wedge between the hook and the eye of the trigger thus preventing the accidental movement of any of the trigger elements and thus allowing the trap to be embedded with perfect safety. It is, of course, obvious that after the trap has been safely embedded the wedge is removed.

By reference to Fig. 1 of the drawings, it will be noted that the springs 8 and 9 when expanded, have their upper arms forcibly contacted with the under faces of the retaining jaws. Such an arrangement prevents the too forcible contact of the jaws 4 and 5, and thus materially adds to the life of the trap.

It is thought that the simplicity as well as the advantages of the trap will be perfectly apparent to those skilled in the art to which such inventions appertain without further detailed description.

Having thus fully described the said invention, what I claim is:—

1. In a trap of the class described comprising a base, a pair of arched jaws pivotally connected with the base, a second pair of jaws each provided with angular ends, and each of the said angular ends having their outer faces arched to correspond to the opposite arched sides of the main jaws, and pivots connecting the angular portions of the auxiliary jaws to the sides of the main jaws.

2. A spring trap of the class described including a base, a pivoted trigger bar arranged upon the base, said bar having its outer end upset, a trigger pivotally connected with said upset portion, a hook member pivotally connected with the bar and having a depressed portion adjacent its pivot which is adapted to be engaged by the trigger, a twig holder pivotally connected with the trigger spring actuated jaws, one of said jaws adapted to be arranged beneath the trigger when the jaws are in an open position, and each of the jaws comprising an arched member having a substantially rectangular auxiliary jaw pivotally connected thereto.

3. A trap for the purpose set forth comprising a base constructed of a rectangular member, standards secured to the opposite ends of the base, a pair of U-shaped coacting jaws pivotally connected with the standards, a second jaw for each of the first named jaws, each of said second jaws comprising a rectangular member having off-set ends which are pivotally connected with the first named jaws, double armed springs having their ends provided with eyes exerting pressure between the base and the jaws to normally retain the latter in a closed position, a pivoted trigger support upon the base, said support having its free extremity upturned and provided with an opening, a flattened trigger provided with an eye engaging the said opening and adapted to overlie one jaw when in set position, a hook member pivotally connected with the support, said hook member being provided with a depression adapted to be engaged by the trigger when the trap is set, a flattened trigger member having a substantially V-shaped opening engaging with the eye of the trigger, the hook member having its inturned portion adapted to overlie and engage the walls provided by the V-shaped opening of the trigger member, and a twig receiving sleeve upon the trigger member, all substantially as and for the purpose set forth.

4. A spring trap of the class described comprising a base, a pair of arched jaws pivotally connected with the base, a second pair of substantially rectangular jaws having angular ends pivotally connected to the sides of the arched jaws and arranged in a plane with and below the arched jaws, two-arm spring members having their ends provided with openings, whereby the same are arranged upon the base and upon the sides of the arched jaws, and the said spring members, when expanded, adapted each to have one of its arms contact with the under faces of the second pair of pivoted jaws.

In testimony whereof I affix my signature in presence of two witnesses.

EMANUEL H. SLOAN, Jr.

Witnesses:
R. G. BLAIR,
J. P. CROWE.